United States Patent [19]

Diermayer et al.

[11] 4,191,326
[45] Mar. 4, 1980

[54] DRAFT CONTROL ARRANGEMENT FOR COMBUSTION APPARATUS

[76] Inventors: Werner Diermayer, 1275 Panorama Dr., Lafayette, Calif. 94549; Luitpold Kutzner, Marschnerstrasse 78, D-8000 Munich, Fed. Rep. of Germany

[21] Appl. No.: 971,518

[22] Filed: Dec. 20, 1978

Related U.S. Application Data

[62] Division of Ser. No. 884,209, Mar. 7, 1978, Pat. No. 4,159,078.

[51] Int. Cl.² .............................................. G05D 23/08
[52] U.S. Cl. ................................. 236/1 G; 236/93 R; 236/101 E
[58] Field of Search ............. 236/93 R, 101 R, 101 E, 236/43, 1 G; 137/846, 847

[56] References Cited

U.S. PATENT DOCUMENTS

| | | | |
|---|---|---|---|
| 1,449,675 | 3/1923 | Heiser | 236/93 R |
| 1,669,707 | 5/1928 | Haynes | 236/96 |
| 2,109,628 | 3/1938 | Alban et al. | 236/93 R |
| 2,437,287 | 3/1948 | Woods | 236/35.2 |
| 2,673,687 | 3/1954 | Alban et al. | 236/93 R |
| 2,763,433 | 9/1956 | Hill | 236/93 R |
| 2,952,337 | 9/1960 | Coffin | 236/93 R X |
| 3,513,881 | 5/1970 | Kinsell | 236/93 R X |
| 4,143,812 | 3/1979 | Fortune | 236/93 R X |

Primary Examiner—William E. Wayner
Assistant Examiner—William E. Tapolcai, Jr.
Attorney, Agent, or Firm—Flehr, Hohbach, Test, Albritton & Herbert

[57] ABSTRACT

A draft control arrangement having bimetallic damper elements mounted in a draft hood and adapted to change shape in response to temperature change to open and close the flow passage for vent gases from a combustion apparatus. The damper elements are positioned in the hood relatively close to the source of hot flue gases to provide faster opening and less tendency for vent gas spillage. When open the damper elements cooperate with stationary walls of the draft hood so that the resulting streamlined passage prevents minimum flow resistance. In certain embodiments the damper elements are arranged to undergo a spreading action during opening movement to achieve a disproportionately large passage for the vent gases during the initial phase of opening. In another embodiment a damper unit is mounted separate from the draft hood and provides the same operating results as the other embodiments.

5 Claims, 10 Drawing Figures

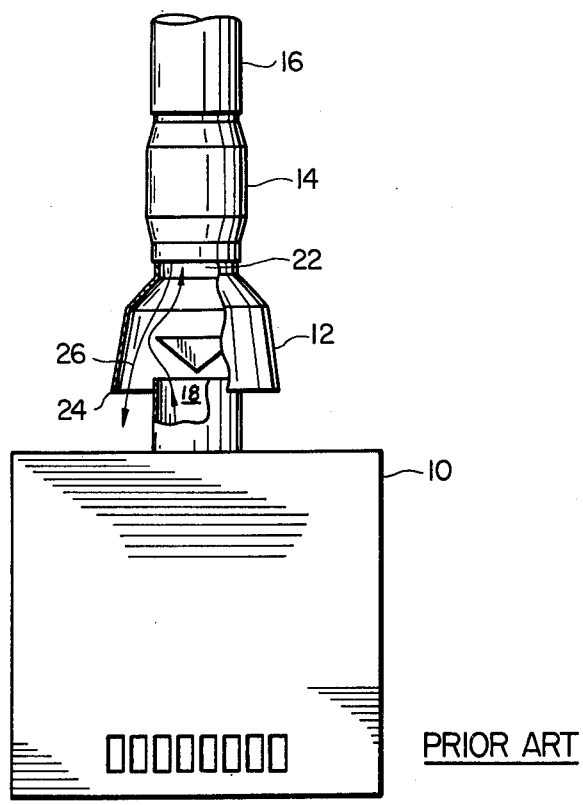
FIG__1 PRIOR ART
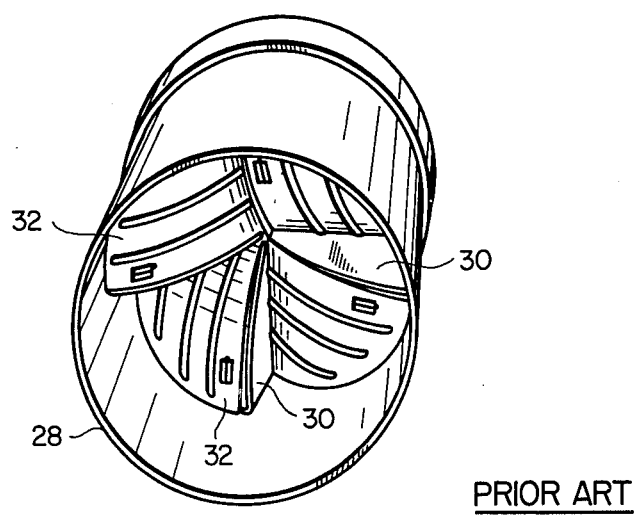
FIG__2 PRIOR ART

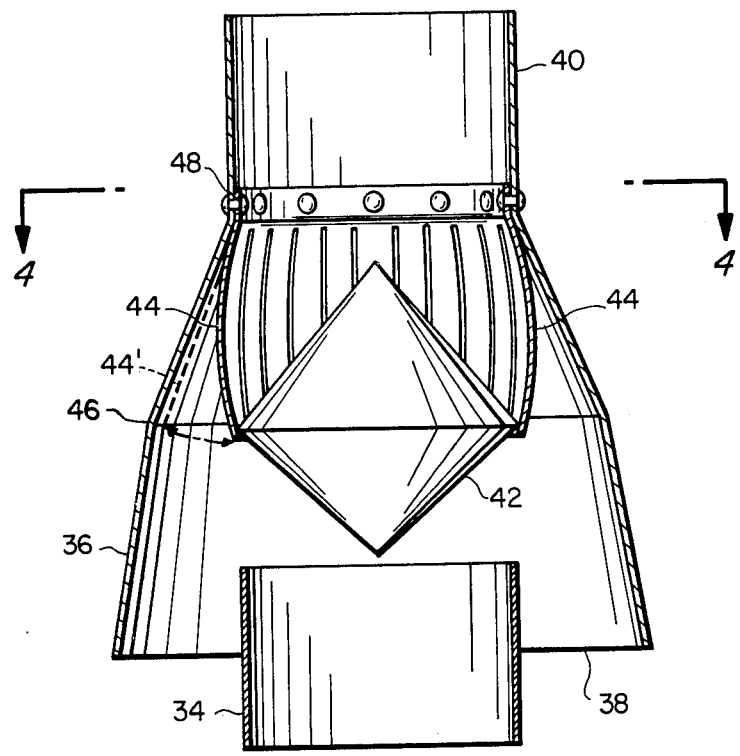
FIG_3
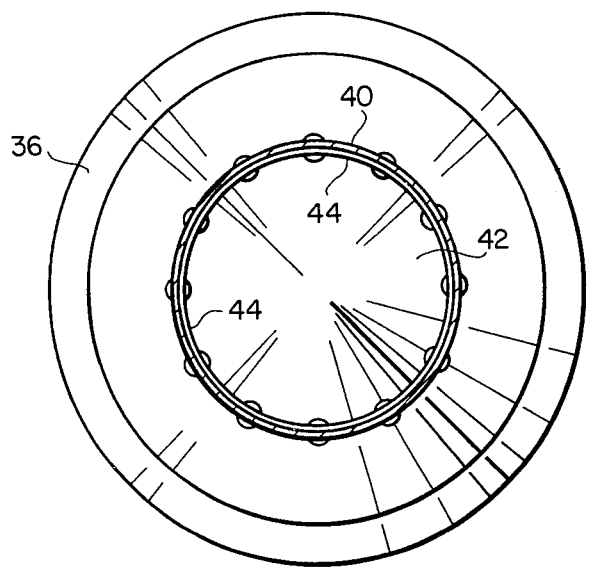
FIG_4

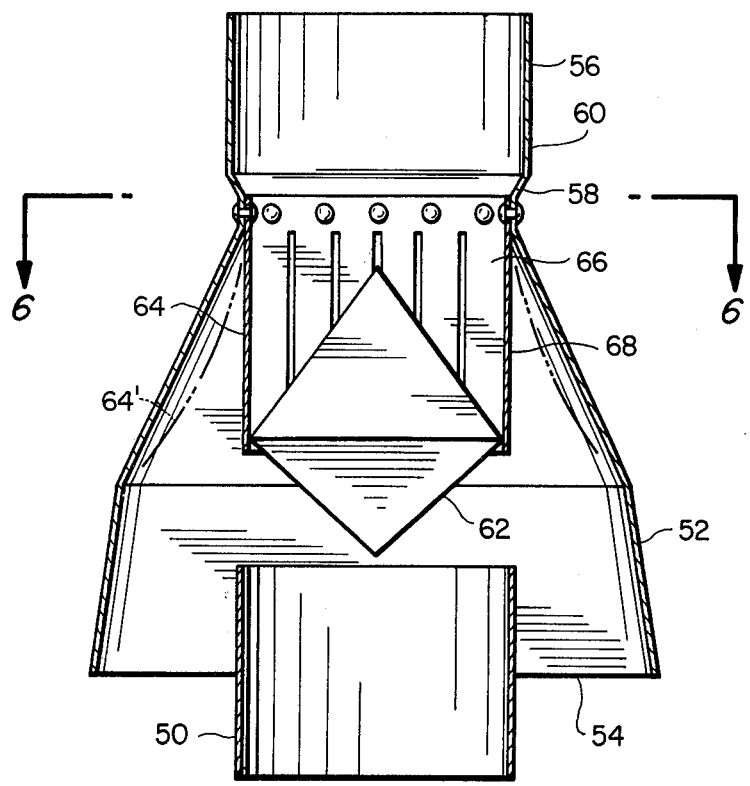
FIG_5
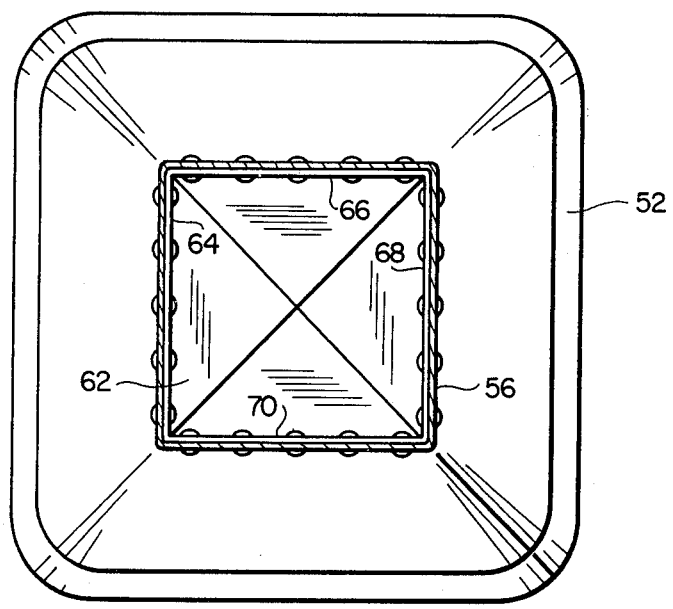
FIG_6

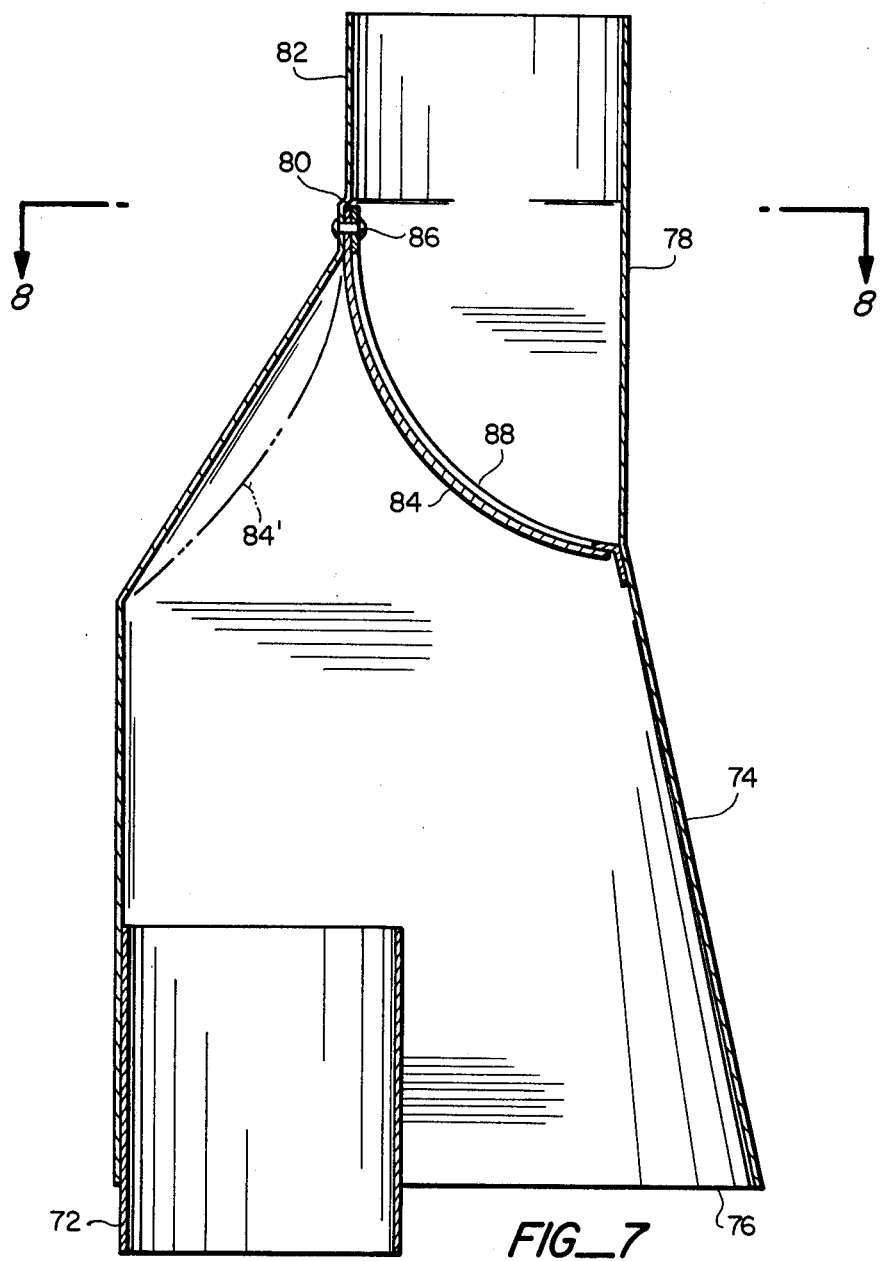
FIG_7
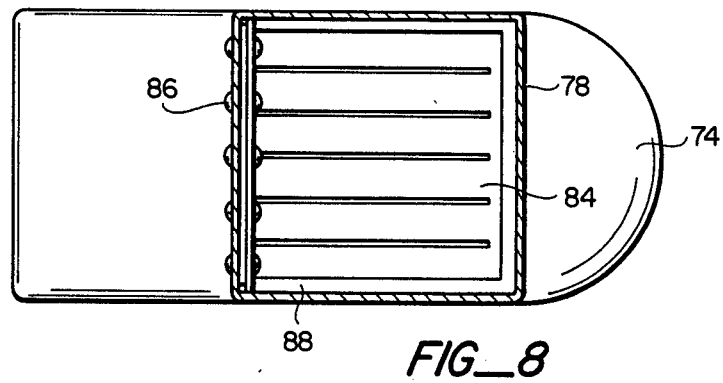
FIG_8

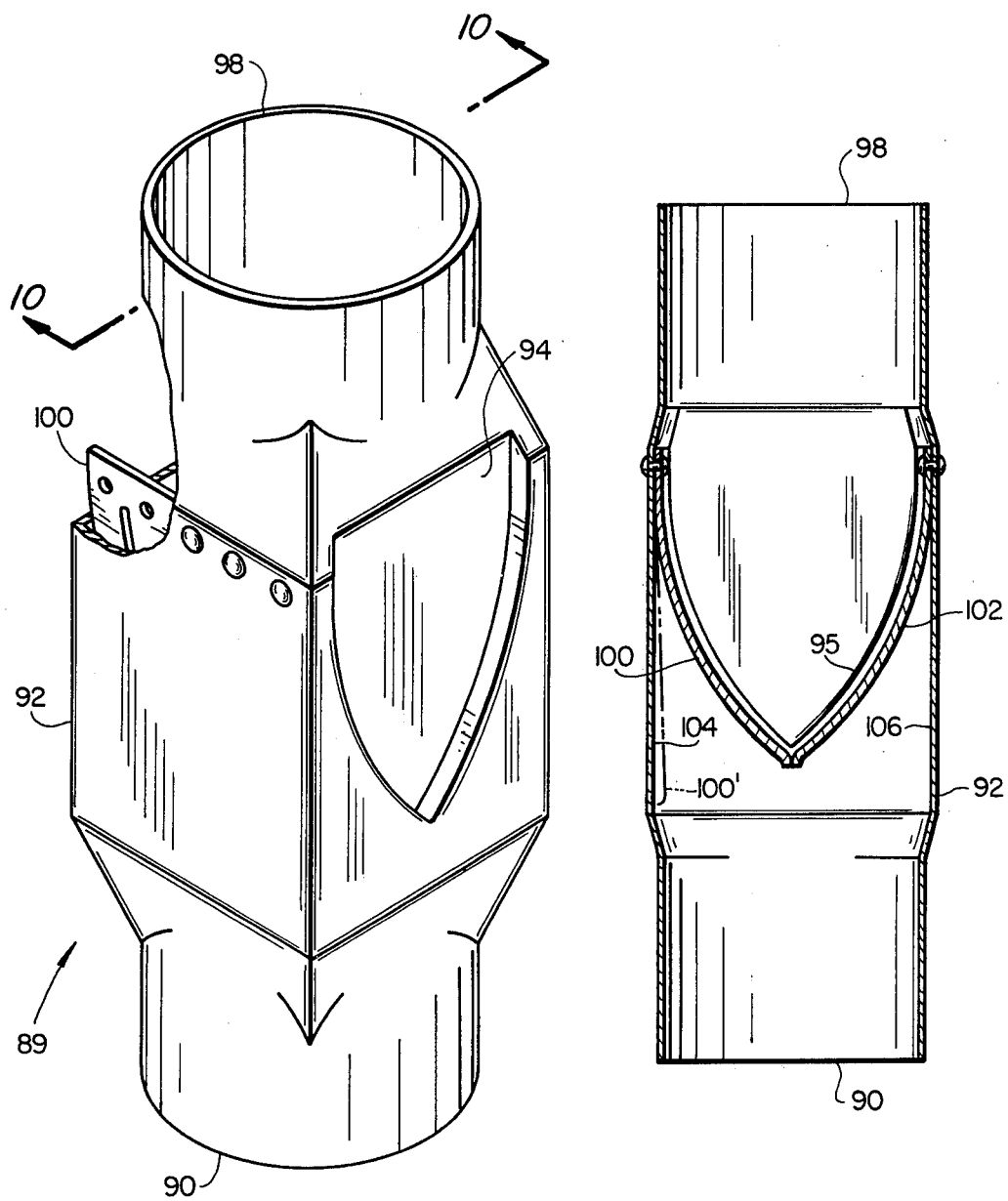
FIG_9
FIG_10

DRAFT CONTROL ARRANGEMENT FOR COMBUSTION APPARATUS

This is a division of application Ser. No. 884,209 filed Mar. 7, 1978 now U.S. Pat. No. 4,159,078, issued June 26, 1979.

BACKGROUND OF THE INVENTION

Vented, gas-fired appliances relying on a natural draft for the removal of products of combustion are equipped with a draft hood which isolates the combustion chamber from excessive updraft or backdraft in the vent. The conduit between the draft hood relief opening and the outside is permanently open and therefore causes heat loss, especially during cold and windy weather.

Automatic vent dampers have been designed to reduce this loss. Examples are the thermally controlled vent dampers described in U.S. Pat. Nos. 3,228,605 and 3,510,059. These automatic, thermally controlled vent dampers are installed between the draft hood and the vent connector. They are open during the operating phase of the appliance and are closed during standby and shutdown periods.

OBJECTS AND SUMMARY OF THE INVENTION

Under certain normal operating conditions the buoyancy force for moving the vent gases from the heating appliance to the outside is small. Draft hoods, as well as vent dampers even in their fully open position, pose a certain resistance to the flow of vent gases. This resistance to flow in the vent system sometimes results in the incomplete removal of products of combustion and causes spillage of vent gases at the draft hood relief opening. It is therefore desirable to reduce to a practical minimum the resistance to flow of vent gases in natural draft appliance-vent systems.

One object of the invention is to reduce the resistance to flow of vent systems containing draft hoods and automatic, thermally controlled vent dampers.

Another object of the invention is to provide a vent system of the type described in which means is provided to form a closure about a bimetal blade when the blade is closed while also providing clearance between the sides of the blade and the housing as the blade moves.

A further object of the invention is an arrangement that prevents possible permanent deformation of bimetal damper elements caused by temperature-induced bending forces if the damper elements are mechanically prevented from moving beyond the fully open position at temperatures above that corresponding to fully open position.

Another object is an arrangement that does not increase flow resistance due to the damper elements bending beyond the fully open position at temperatures above that corresponding to such position.

The invention in summary includes bimetallic damper elements which are shaped and arranged in the damper housing so that the passage through the housing is closed during the non-operating phases of the heating apparatus and so that the damper elements move out of the flow of the vent gases.

The draft control arrangement includes: (a) a damper in which the sensing element and the throttling element is the same part, i.e. no transmission of movements, forces or signals from one component to another is required for its function; (b) damper elements arranged with a closure surface such that a small flexing movement of the bimetallic damper element, during its opening movement, opens a relatively large area for the passage of vent gases; (c) installation of the damper elements in the flow path in a manner that minimizes resistance to flow of the vent gases in natural draft vent systems containing draft hood and vent damper; (d) an arrangement that avoids possible permanent deformation of bimetal damper elements caused by temperature-induced bending forces if the damper elements are mechanically prevented from moving beyond the fully open position at temperature above the corresponding to fully open position of the damper; (e) providing modulating draft control by the continuous and nearly instantaneous response of the bimetallic damper elements to temperature differences in the vent gases. With a strong draft aspirates an excessive amount of dilution air through the draft hood relief opening the temperature of the mixture of the flue gases and dilution air decreases and the bimetal damper elements close partially, until a new equilibrium at a lower rate of dilution air is established. In addition to their primary job of saving energy by closing the vent during the standby phases of the heating apparatus the embodiments of this invention reduce heat loss also during the operating phases by the described modulating action.

BRIEF DESCRIPTION OF THE DRAWINGS

FIG. 1 is a schematic view of a typical prior art combination of heating apparatus, draft hood, vent damper and vent connector.

FIG. 2 is a perspective view of a prior art thermally controlled vent damper.

FIG. 3 is a longitudinal section view of one embodiment of the present invention.

FIG. 4 is a sectional view taken along the line 4—4 of FIG. 3.

FIG. 5 is a longitudinal section view of another embodiment of the invention.

FIG. 6 is a section view taken along the line 6—6 of FIG. 5.

FIG. 7 is a longitudinal section view of another embodiment of the invention.

FIG. 8 is a section view taken along the line 8—8 of FIG. 7.

FIG. 9 is a perspective view, partially broken-away, of another embodiment of the invention.

FIG. 10 is a longitudinal section view taken along the line 10—10 of FIG. 9.

BRIEF DESCRIPTION OF THE PRIOR ART

FIG. 1 shows a typical prior art assembly comprising heating apparatus 10, draft hood 12, vent damper 14 and vent connector 16. During normal operation the vent gases flow upward from the heating apparatus through draft hood inlet 18, hood 12, outlet 22, vent damper 14 and into vent connector 16. If excessive draft prevails considerable amounts of dilution air are drawn into the vent through the annular draft hood relief opening 24. If a backdraft reverses the flow in the vent the gases from the vent, entering through draft hood outlet 22, and the products of combustion coming from the heating apparatus through draft hood inlet 18 flow out of the draft hood at the relief opening 24, as shown by arrow 26. In the case of excessive updraft or downdraft the draft hood isolates the combustion process in the heating apparatus from disturbing flows. Draft hoods are therefore required components of natural draft gas-fired heating systems.

FIG. 2 shows a prior art thermally controlled vent damper. The damper comprises tubular housing 28 which is subdivided by partitions 30 into sections, illustrated as four quadrants. Each quadrant is covered by a thin slotted bimetal flap 32. The flaps are attached at their upper edges to the partitions and curve upward into abutting relationship with the partitions when the damper is closed. The temperature of hot flue gases causes the flaps to change shape and uncurl to open the throttle area. When temperatures above that corresponding to fully open position are encountered the flaps could move beyond that position creating increased flow resistance.

DESCRIPTION OF THE PREFERRED EMBODIMENTS

FIGS. 3 and 4 illustrate a first embodiment of the invention comprising a round, tubular draft hood inlet 34 which connects with the heating apparatus, a draft hood 36, annular relief opening 38 and round, tubular outlet 40 which connects with a vent. Double-cone baffle 42 is concentrically mounted within the draft hood by suitable brackets, not shown, which can be attached to the hood inlet. A plurality of bimetallic damper elements 44 are mounted at their upper ends about the lower rim of outlet 40. The damper elements are petal-shaped and can be formed of juxtaposed strips, or of one or more plates having slots which form a plurality of distal ends. The damper elements assume at ambient temperature an approximately spherical shape and cooperate with the baffle to form a closure across the passage through the draft hood. When the heating apparatus is turned on the hot flue gases rise from the combustion chamber through inlet 34 into the draft hood. The gases heat the bimetallic damper elements which are caused to flex away from baffle 42 and thereby open the passage for flue gases and dilution air through outlet 40 into the vent.

In addition to the annular opening which is established between baffle 42 and the tips of the bimetal elements 44 by the initial opening movement, passages open laterally between the tips of the individual elements resulting from their spreading movement. The total opening available for passage of vent gases shortly after the opening movement starts is therefore disproportionately high and helps reduce the tendency for spillage at startup. When fully open the damper elements assume a straight shape at position 44' in abutting surface-to-surface contact with the hood. At the fully open position the resistance to flow due to the damper elements becomes negligible due to the streamlining as the elements conform to the inner contour of the draft hood. The hood could also be slightly widened at its circumference between points 46 and 48, thereby creating a shallow depression inside the hood. The bimetallic elements would move into such a depression in their fully opened position, thereby being flush with the inner surfaces of the hood and the outlet.

It is generally desirable that a thermally controlled vent damper starts opening at a certain temperature, e.g. 160° F., and that it reaches its fully open position at the minimum temperature prevailing at the damper during full flame operation. However temperature much higher than the said minimum operating temperature may occur at the damper during the operation of the heating apparatus during which no further movement of the bimetal blades is desirable. Yet the bimetal elements tend to react to higher temperature by further flexing beyond the fully open position. When a movement beyond the fully open position is prevented by a mechanical stop the bending force may be strong enough to cause a permanent deformation of the bimetal elements. In all embodiments shown in this specification a movement beyond the fully open position is prevented by the walls of the draft hood or damper housing respectively. However in the embodiments shown in FIGS. 3, 4, 9 and 10 a buildup of bending forces in the bimetal blades at higher than "fully open" temperatures is effectively reduced. The close proximity or contact of the bimetal blades with the wall of the draft hood or damper housing prevents circulation of hot vent gases between the bimetal blades and wall, while surface-to-surface contact allows heat to transfer from the bimetal blades to the wall and from the wall to the ambient air.

FIGS. 5 and 6 show another embodiment comprising a round, tubular inlet 50, a pyramid-shaped hood 52, a relief opening 54, and an outlet 56 which forms a transition from square at 58 to round at 60 where it connects with a vent. A double-pyramide baffle 62 is concentrically mounted with the draft hood by suitable brackets, not shown, which can be attached to the hood inlet. The bimetallic damper elements in this embodiment comprise four rectangular, slotted plates 64-70 fastened to the respective sides which form the square, lower part of outlet 56. The slots determine the direction in which the bimetal elements curve under the influence of temperature changes. At room temperature the four plates cooperate with the baffle to form a closure across the passage between the draft hood inlet and outlet.

When the heating apparatus is turned on the hot flue gases rise through inlet 50 into the draft hood. The gases heat the bimetal damper elements 64-70 and cause them to flex away from baffle 62 and thereby open the passage for the flue gases through outlet 56 into the vent. In the fully open position the damper plates, as shown by dashed line 64', are smoothly curved against the draft hood wall so that the flow passage is streamlined.

FIGS. 7 and 8 illustrate a further embodiment which includes a round, tubular inlet 72, a draft hood 74 with essentially rectangular cross section, relief opening 76 and a laterally offset outlet 78 which forms a transition from square at 80 to round at 82 where it connects with a vent.

A bimetallic slotted damper blade or plate 84 is secured by fasteners 86 to one side of the square portion of outlet 78. At room temperature both opposite sides and the freely moving lower end of the damper plate contact frame 88 so as to form a closure across the passage through outlet 78.

When the heating apparatus is turned on the hot flue gases rise through inlet 72 into the draft hood. The gases heat the bimetal damper plate 84 and cause it to flex away from frame 88. When fully open, the damper plate is at position 84' with the curvature indicated by the dashed line. In this position the damper plate provides a streamlined shape presenting a minimum resistance to the flow of gases.

FIGS. 9 and 10 illustrate a vent damper 89 incorporating a further embodiment of the invention. Under certain circumstances, e.g. if the draft hood is an integral part of an existing heating apparatus which cannot or should not be modified, the vent damper 89 can be placed in the conventional manner between the draft hood and the vent connector. Vent damper 89 comprises a round inlet 90, a housing 92 shown here as having essentially square cross-section with two indentations or recesses 94, 95 in opposite walls, and a round outlet 98. Two essentially rectangular, slotted, curved bimetal blades 100 and 102 are fastened at their upper ends to the housing. The bimetal blades are narrower that the inside width of the housing, thereby providing ample lateral clearance for their unrestricted movement. The inner sides of the recesses are curved to conform and overlap with the side margins of the respective blades when in their closed position.

At ambient temperature the bimetal blades are curved inward and their lower ends touch each other. Lateral edges of the blades also touch the curved inner sides of the recesses 94, 95 formed in the housing and thereby essentially close the flow passage through the damper.

When hot products of combustion rise from the heating apparatus the bimetal blades start to uncurl and at the full, steady state operating temperature assume a straight shape parallel to, and essentially touching, the walls of the housing to which they are fastened as indicated by dashed line 100'. Shallow depressions 104, 106 are formed in opposite sides of housing 92 by the increase in lateral dimension of the housing walls in comparison to the diameter of the round inlet and outlet. There is a gradual transition from round to square at the inlet, and from square to round at the outlet. The damper blades when straight are seated flat against the walls of the housing inside the depressions where the blades are out of the gas flow passage.

The embodiment of damper 89 thereby achieves the following new combination of functions: (a) the sensing and throttling element is the same part; (b) the housing, including the shallow depressions, and bimetal blades are shaped and arranged in such a way that resistance to flow is minimized; (c) modulating draft control is provided and (d) buildup of excessive bending forces in the bimetal damper elements at high temperatures is avoided, as explained in connection with the embodiment of FIGS. 3–4.

Bimetal blades produce small forces for their own movements. It is therefore essential for reliable functioning of a thermal vent damper to eliminate, by design, any possible friction or restraint. In the embodiments of FIGS. 7 through 10 the lateral edges of the bimetal blades move parallel with and close to the walls of the housing. To prevent possible touching and friction between the edges of the bimetal blades and the housing a relatively large clearance is provided. The gap thereby created reduces the effectiveness of the vent damper to close the vent. In the invention the frame 88 of FIGS. 7–8 as well as the recesses 94 and 95 of FIGS. 9–10 form closure surfaces which provide essentially complete closure of the vent in the situations where there is a considerable clearance between the lateral walls and the bimetal blades for unrestrained movement.

A large lateral clearance of the kind described above causes a disproportionately large opening of the vent passage during the initial phase of the opening movement, thereby reducing the tendency for vent gases to spill at the draft hood opening.

An effect mentioned previously in the description of FIGS. 3 and 4, namely the formation of a disproportionately large opening during the initial phase of the opening movement by passages opening laterally between the strips of bimetal resulting from their spreading movement, can also be achieved in a vent damper. For that purpose a number of individual, curved bimetal strips would be shaped and fastened inside the circumference of a round damper housing in such a manner that their tips, at ambient temperature, touch a small double-cone or similar streamlined, round stop installed in the center of the damper housing.

While the foregoing embodiments are at present considered preferred it is understood that numerous variations and modifications may be made therein by those skilled in the art and it is intended to cover in the appended claims all such variations and modifications as fall within the true spirit and scope of the invention.

What is claimed is:

1. A damper for controlling the flow of vent gases from a gas-fired heating apparatus, including the combination of a housing enclosing a portion of the flow path of vent gases from the heating apparatus, temperature responsive means mounted within the housing for movement across the path between open and closed positions responsive to the temperature of vent gases, said temperature responsive means when in its open position being oriented in streamlined relationship along the path to present a minimum of resistance to the flow of gases, the temperature responsive means including at least one bimetal blade, and the housing includes means having a closure surface which overlaps and forms a closure with the side margins of the blade when the blade is in its closed position to essentially close the flow path, said housing further including a pair of opposite walls each having recesses having inner sides which form said closure surface means with the inner sides shaped to conform with the side margins of the blade when the blade is in its closed position.

2. A damper as in claim 1 in which the bimetal blade when in its open position assumes a flat shape essentially parallel to the flow of vent gases and in a streamlined relationship with such flow.

3. A damper as in claim 1 which includes shallow depression means formed on the inside of the housing, said bimetal blade when in its open position being seated within the depression means essentially out of the path of the vent gases.

4. A damper as in claim 1 in which at least two of said bimetal blades are provided.

5. A damper as in claim 1 in which the housing includes wall means, and the bimetal blade when in its open position lies in surface-to-surface contact along its length against the wall means in heat conducting relationship therewith so that heat is carried away from the bimetal blades to minimize overheating thereof.

* * * * *